United States Patent [19]
Kawaragi et al.

[11] Patent Number: 5,871,574
[45] Date of Patent: Feb. 16, 1999

[54] METHOD FOR COLLECTING TOMATO PIGMENT AND ITS APPLICATION

[75] Inventors: Masatugu Kawaragi; Toshiharu Kuraishi, both of Gunma-ken; Hisashi Shirasawa, Kasukabe; Norihisa Takada, Numata; Katsumi Yuasa, Funabashi; Saburo Kojima, Numata, all of Japan

[73] Assignee: Nippon Del Monte Corporation, Tokyo, Japan

[21] Appl. No.: 886,451

[22] Filed: Jul. 1, 1997

[51] Int. Cl.$^6$ .................................................. C04B 16/02
[52] U.S. Cl. ...................... 106/406; 106/407; 106/493; 106/499; 426/429; 426/540
[58] Field of Search ................... 106/406, 407, 106/493, 499; 426/540, 429

[56] References Cited

U.S. PATENT DOCUMENTS

| | | | |
|---|---|---|---|
| 4,781,936 | 11/1988 | Nafisi-Movaghar | 426/429 |
| 4,851,339 | 7/1989 | Hills | 435/67 |
| 4,925,690 | 5/1990 | Odake | 426/330.5 |
| 4,978,549 | 12/1990 | Takada et al. | 426/489 |
| 5,079,016 | 1/1992 | Todd, Jr. | 426/250 |
| 5,547,997 | 8/1996 | Kludas | 514/773 |

FOREIGN PATENT DOCUMENTS

| | | |
|---|---|---|
| 0 608 027 A2 | 7/1994 | European Pat. Off. . |
| WO 95/16363 | 6/1995 | WIPO . |

*Primary Examiner*—Deborah Jones
*Assistant Examiner*—Scott L. Hertzog
*Attorney, Agent, or Firm*—Banner & Witcoff, Ltd.

[57] ABSTRACT

A tomato pigment is obtained by centrifuging a treated mass of tomato, collecting the liquid portion thereof, passing it through a microfilter, recovering the retentate, preferably mixing this retentate with an organic solvent with stirring, and removing the extraction fractionated organic solvent.

5 Claims, 1 Drawing Sheet

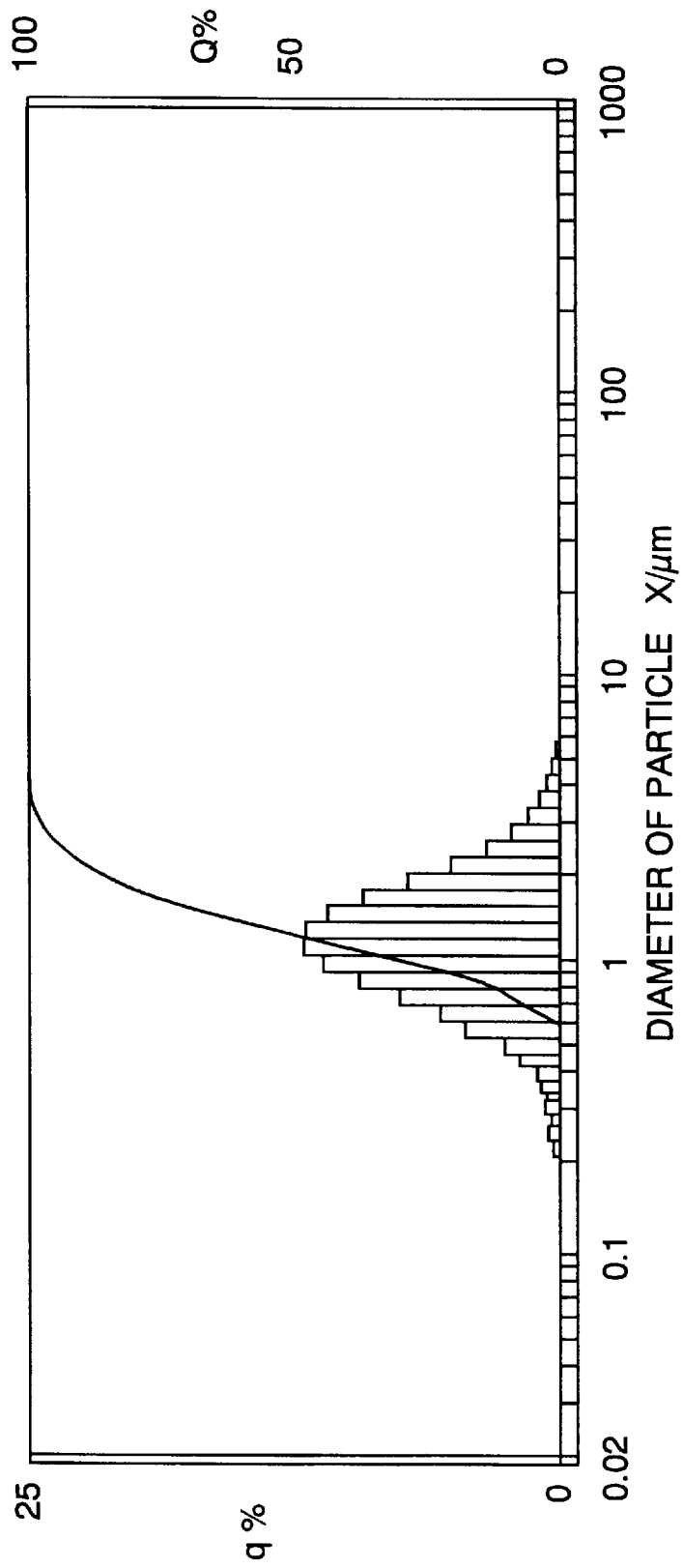

METHOD FOR COLLECTING TOMATO PIGMENT AND ITS APPLICATION

BACKGROUND OF THE INVENTION

1. Field of the Invention

The present invention relates to a method for collecting a tomato pigment. More particularly, it relates to a method for collecting, at high efficiency and by simple means, a tomato pigment useful as a natural coloring matter for foods or as a natural pigment for cosmetics such as rouge, said pigment having high stability against oxidation, lightening, heating and storage, and containing a lycopene complex or a purified product thereof having an average particle diameter of 0.2–10 μm.

2. Description of the Related Art

There have been known techniques for obtaining a deep red-tinged tomato concentrate by mashing tomato, decomposing it with a plant tissue maceration enzyme, passing the resulting mass through an ultrafiltration membrane having a cut-off molecular weight of 120,000–200,000, and obtaining the tomato concentrate from the membrane-retentate (JP-B 59-35580).

A method is also known in which an alkali is added to mashed tomato to separate a carotenoid complex from the vital tissues, with the unnecessary matters such as skins, seeds, fibers, etc., being removed from the separated solution, then an acid is added thereto to have the carotenoid pigment fractionally precipitated, the precipitate being then collected with its pH adjusted close to neutrality or slightly alkalinity and concentrated, followed by addition of an acid to make the product acidic, and then common salt is further added to thereby obtain carotenoid to be used for red coloring of foods (JP-B 55-1311). There is further known a technique for separating lycopene from a pulp fraction as a tomato oleoresin (WO 95/16363). However, since lycopene in the form of oleoresin is an oil, it is required, in use thereof, to make a choice over whether it is left as an oil or mixed with an emulsifier, so that the scope of its use, especially in aqueous foods, is limited.

The tomato concentrates contain richly such insoluble solid matters as pulp, polysaccharides and proteins and such soluble matters as sugars, acids and aromatic substances, and carry heavily a flavor peculiar to tomato, so that they have a disadvantage in that the scope of its use as a pigment is limited, and also the lycopene content is low.

Said carotenoid for food coloration, although characteristically high in lycopene content, requires use of an alkali and an acid in preparation thereof and necessitates a very complicated production process, and further, since the products containing carotenoid have a salty taste, its use in foods and cosmetics as a pigment is necessarily restricted.

SUMMARY OF THE INVENTION

As a means for obtaining a tomato pigment, the present inventors had completed a technique for separating and concentrating a lycopene pigment by centrifuging a mashed mass of tomato, recovering the liquid portion thereof and subjecting it to microfiltration.

The tomato pigment obtained according to this method is characterized in that it maintains water dispersibility of the lycopene-containing particles of tomato, but this pigment is not necessarily satisfactory in practical use because of its rather dark color tone. So, it is expected that the improvement of its color tone would widen the field of its use, and researches have been made for establishing a simple and economical method for purification of lycopene.

The present invention, therefore, is intended to offer a method for producing, at high efficiency and by simple means, a tomato pigment of high purity and good color tone, which pigment has lycopene as its main component and is useful as a natural coloring matter for foods or as a natural pigment for cosmetics such as rouge or pharmaceutical products of non-official grade.

The present inventors found that the tomato pigment obtained by following the steps of adding an organic solvent to a membrane-retentate obtained in the manner described above to a specified concentration, mixing them with stirring then purifying and separating the product, is free of the taste-creating substances originating in tomato and the coexisting pigment as they are removed in the form of organic solvent soluble materials, and is also high in purity, tinged in bright red color and improved in color tone.

Thus, the present invention provides a method for obtaining a tomato pigment characterized by the steps of centrifuging a treated mass of tomato, collecting the liquid portion thereof, and subjecting it to microfiltration to recover the membrane-retentate and a further method for obtaining a tomato pigment which comprises adding an organic solvent to the membrane-retentate to a concentration of 50–90 w/w %, followed by mixing with stirring, and purifying the resulting product. The tomato pigment obtained by this method is envisaged to be used as a natural coloring matter for foods or as a natural pigment for cosmetics.

A detailed description of the present invention is given below. The technical terms used in the present invention are defined as follows.

Lycopene:

It refers to a compound constituting the basis of the tomato pigment and represented by the molecular formula $C_{40}H_{56}$. It is not restricted by the compositional ratios of its stereoisomers.

Lycopene complex:

It refers to a unit synonymous with the pigment structure in which lycopene and other vital components are bound together or coexist. This pigmental unit consists of plural components, with lycopene molecules constituting as the main component.

Chloroplast:

It refers to intracellular pigment particles containing a lycopene complex. Carotenoid pigments other than lycopene or chlorophyll are also partly contained.

Tomato pigment:

It refers to a tomato-derived pigment containing lycopene, lycopene complex and chloroplast at optional ratios.

As the treated mass of tomato used in the present invention, a mashed or ground mass of tomatoes, a strained (pulper-passed) product thereof, a mass treated with a plant tissue maceration enzyme and the like can used.

Typical examples of such treated masses of tomato are a tomato paste obtained by mashing flesh of tomatoes and passing it through a screen to remove skins, seeds and other unnecessary matters, which may or may not be followed by concentration, a tomato puree obtainable by the conventional methods, tomato juice, reconstituted tomato juice, and the like. This treated masses of tomato is preferably subjected, before centrifugation, to a physical milling treatment utilizing a mechanical shearing force, such as treatment by a blender type mill, and/or a treatment with a plant tissue maceration enzyme, to destroy the plant cells as these treatments facilitate preparation of a tomato pigment containing a lycopene complex in a high concentration. The enzyme treatment may be conducted on the liquid portion collected after centrifugation.

The plant tissue maceration enzymes usable in this invention include pectolyase, pectinase, cellulase, hemicellulase, protease, amylase, lipase and the like.

The enzyme treatment is preferably carried out with gentle stirring at around the optimal pH and temperature. For instance, in case of using pectolyase, it is recommended to carry out the treatment at pH 3–4 and 20°–55° C. until the tissue structure destroyed.

The treated tomato mass is preferably centrifuged after undergoing a heat treatment so that the residual enzyme may be perfectly inactivated, although a centrifugation without heat treatment may be effected.

The tomato mass may be centrifuged after preliminary filtration with a coarse-mesh filter cloth to remove the water-insoluble solids suspended in the tomato mass.

The thus treated tomato mass is then uniformly stirred either in the form as it is or after adding 2–5 times as much volume of water in case the tomato mass is a tomato paste to form an aqueous suspension, and then centrifuged. Formation of such an aqueous suspension is desirable as it allows obtainment of the desired tomato pigment at a high recovery rate and it also produces a cleaning effect through contact with a large volume of water, making it possible to obtain a tasteless and odorless tomato pigment.

The method of centrifugation is not specified; it is possible to employ any known method as far as it is capable of separating the tomato mass into a liquid portion and a sedimental portion in a short time. For example, high-speed centrifugation may be employed.

The centrifugal force and time to be used for the centrifuging operation are properly decided so that recovery of the liquid portion will be maximized when the tomato mass is separated into the liquid portion and the sedimental portion. For example, the operating conditions of 3,000–10,000 G and 30 seconds to 10 minutes may be employed.

This centrifugation is an important step in the present invention. By this operation, the tomato mass can be very easily separated into half-liquid (pasty) solid matter and a liquid portion.

Since the lycopene complex contained in the tomato mass is liberated in the liquid portion, it is possible to recover lycopene contained in the starting material at high efficiency by recovering said liquid portion through centrifugation.

The thus obtained liquid portion contains the lycopene complex in a high concentration, but it also contains impurities originating in the starting material, which include insoluble substances such as polysaccharides, proteins, etc., and soluble substances such as sugars, acids, aromatic substances, etc., in high concentrations.

In the present invention, said liquid portion is microfiltered to be separated into a membraneretentate containing the desired lycopene complex in a high concentration (this portion being hereinafter referred to simply as "the retentate") and a filter passed liquid portion containing impurities (this portion being hereinafter referred to simply as "the permeate").

Microfiltration (MF) employed in the present invention is a technique for separating out the suspended particles of around 0.2–10 $\mu$m in diameter contained in said liquid portion by using a membrane. Generally, a microfiltration membrane is of a mesh size that allows separation of the suspended particles of the order of 0.01 to several $\mu$m in diameter. In the present invention, the desired lycopene complex can be recovered efficiently by using a membrane having an average mesh size of 0.01–5 $\mu$m, preferably 0.1–0.5 $\mu$m.

The microfiltration membrane used in the present invention may be a tubular type, capillary type, spiral type or hollow fiber type assembled membrane. Specifically, the organic membranes made of a polysulfone type, fluorine type, polyolefin type or other like material and the inorganic membranes made of a ceramic material can be used as the microfiltration membrane.

The organic membranes usable in the present invention include those commercially available under the trade names of NTF-5201, 5202 and 52005 (Nitto Denko Co., Ltd.), MFK-613 (ABCOR CO.), PW-303 (Asahi Chemical Industry Co., Ltd.), etc. An example of the inorganic membranes usable in this invention is a ceramic membrane CEFILT (NGK Insulators, Ltd.)

Microfiltration is carried out under the normal operating conditions, that is, under the operating pressure of 0.1–8.0 $kg/cm^2$ and the temperature 10°–80° C.

Microfiltration of the liquid portion is performed by using a suitable equipment under the appropriate conditions.

In case of using a tubular type ceramic membrane, the treatment is preferably carried out under the conditions of 10°–80° C. for membrane inlet temperature, 3.0–9.0 $kg/cm^2 \cdot G$ for inlet pressure and 2.0–8.0 $kg/cm^2 \cdot G$ for outlet pressure. In the case of a plate type organic membrane filter, it is suggested to carry out the operation under the conditions of 10°–80° C. for membrane inlet temperature, 2.0–8.0 $kg/cm^2 \cdot G$ for inlet pressure and 0.1–5.0 $kg/cm^2 \cdot G$ for outlet pressure.

As described above, by a very simple process merely comprising the steps of centrifuging a tomato mass, collecting the liquid portion, passing it through a microfilter and collecting the retentate, it is possible to produce at high efficiency a tomato pigment containing a lycopene complex having an average particle diameter of 0.2–10 $\mu$m in an amount of more than 300 mg % as pure lycopene while containing only less than 2 wt % of impurities (insoluble solids).

Said lycopene complex is mostly constituted in chloroplast. Since the complex has the property being suspended in the tomato cells of the chloroplast, said complex shows very high suspendability in aqueous liquids, contains no salt and is also almost tasteless and odorless, so that this complex is useful as a natural coloring matter for foods or as a natural pigment for cosmetics such as rouge and pharmaceutical products of non-official grade.

It is remarkable that a tomato pigment completely free of heat-resistant bacteria can be obtained by conducting a heat treatment under the conditions falling in the region above the borderline drawn by connecting the points of 90° C./7 min, 100° C./3 min, 110° C./3 min, 115° C./3 min and 118° C./one min on a graph of coordinates of heating temperature represented on the vertical axis and heating time (min) horizontally.

Said retentate contains an enriched lycopene complex which is very low in content of impurities, for example, high-molecular weight substances such as protein and low-molecular weight substances such as sugars, organic acids and amino-acids, but its color tone is not always satisfactory. As means for further decreasing impurities, there may be employed, for instance, a method in which a large amount of water is added to the enriched lycopene complex and the solution is microfiltered, or a method in which a proper amount of water is added thereto and the solution is microfiltered in multiple stages. However, these methods, although capable of removing the water-soluble impurities originating in feedstock tomato, is unable to eliminate the fat-soluble substances coexisting with lycopene, such as other carotenoid substances.

This lycopene complex is present in the pigment particles (chloroplast) in the tomato cells and coexists with other carotenoids. These chloroplast particles are of a size of 0.2–10 μm and stay suspended in aqueous solutions.

The color tone of the lycopene complex obtained from said retentate is affected by the composition of coexisting carotenoid in chloroplast. It is therefore necessary to remove other carotenoid substances for obtaining a bright red color peculiar to lycopene.

So, in the present invention, an organic solvent is added to the membrane retentate containing the lycopene complex obtained after said microfiltration so that the solvent concentration would become 50–90 w/w % (hereinafter represented simply by %), followed by mixing with stirring, and after removing the fractionally extracted organic solvent, the produced tomato pigment is purified.

Any organic solvent capable of fractionally eluting lycopene and other carotenoid substances can be used. Typical examples of such organic solvents are methanol, ethanol, propanol and acetone. In case the tomato pigment obtained according to the present invention is to be used as a coloring matter for foods, ethanol is especially preferred as the organic solvent. In carrying out elution, the optimal conditions are set in consideration of the existing state and properties of the substances to be treated.

Addition of an organic solvent to a final concentration of 50–90%, preferably 75–85%, causes aggregation and sedimentation of the pigment particles. When the final concentration is less than 50%, the pigment particles sediment poorly and a great deal of labor is required for recovery of the pigment. The state and properties of the sediment containing lycopene purified and aggregated and sedimented by said organic solvent also greatly influence the separation efficiency of the organic solvent in the ensuing step. Therefore, the final concentration of the organic solvent is preferably set to be not less than 50%. Also, by setting the final concentration of the organic solvent at 50% or above, preferably at 75–85%, removal of beta carotene, etc., is facilitated to allow formation of a bright red color tone.

The method of mixing said retentate and the organic solvent is not specified; any method such as, for example, ordinary mechanical stirring, capable of effecting uniform mixing can be employed. As for the stirring time, any appropriate time, such as 30 minutes to 2 hours, for allowing the solvent to penetrate sufficiently into the inside of the pigment particles to contact with the impurity substances other than lycopene to have them eluted can be employed. Separation and recovery of the sediment after stirring may be performed either batchwise or continuously. A stationary system, compression system or centrifugal system may be employed for this operation, and a filter paper, filter cloth or plastic plate may be used as filter medium.

When water is added to the collected sediment, there can be obtained a tomato pigment with a bright red color tone.

As an index of judgement of color tone of the collected sediment, there can be used the value of a/b, the a and b values being determined by a color-difference-meter. The greater the value of a/b, the stronger is judged the reddishness.

The thus obtained tomato pigment of the present invention, as compared with those which said organic solvent treatment has not been effected, is higher in lycopene purity and presents a brighter reddish color tone, so that it can be effectively utilized as a natural coloring matter for foods or as a natural pigment for cosmetics such as rouge and nail polish, and pharmaceutical products of non-official grade. In use of the tomato pigment of the present invention as a coloring agent or pigment, its amount used may be properly selected in accordance with the desired degree or strength of coloration. For instance, it may be added so that the lycopene content will fall in the range of 0.5–500 mg %.

BRIEF DESCRIPTION OF THE DRAWING

FIG. 1 shows the result of measurement of scattered particle size distribution by laser diffraction of a water suspension of the tomato pigment after microfiltration.

PREFERRED EMBODIMENTS OF THE INVENTION

The present invention will be described in further detail by showing the examples and the test examples.

Analysis of lycopene in the following Examples was made according to the method described in HANDBOOK OF ANALYSES, Tomato Products, Sauce and Vinegar (PART 1), compiled by The Japan Inspection Institute of Tomato Products and Seasonings, pp. 8–9, 1981, in which the methanol-cleaned specimen is extracted with benzene, then absorbance of the extract is measured at 480 nm by a spectrophotometer (U-2000 mfd. by Hitachi Ltd.) and the lycopene content is determined from the following equation:

Lycopene content (mg %)=(absorbance at 480 nm)×20.16÷weight of specimen (g)

EXAMPLE 1

(Preparation of lycopene complex-containing tomato pigment from tomato flesh)

Tomato flesh was mashed and strained in the usual way to remove the skins and seeds, and then concentrated to prepare a tomato puree having a soluble solid content (Brix scale) of 10.5% and a consistency (30-second flow distance measured by a Bostwick consistometer) of 9.8 cm.

This suspension was circulated several times in a blender type grinder at a speed of 10,000 r.p.m. to obtain a treated tomato mass in which the tissues and cells of tomato have been almost perfectly destroyed as observed under a microscope and whose consistency as measured by a Bostwick consistometer was 6.8 cm/30 sec (consistency increased 144% after the treatment).

A plant tissue maceration enzyme pectolyase (produced by Seishin Co.) was added to said tomato mass under the conditions of pH 3.5 and 30° C. to a concentration of 10 mg % and then this preparation was stirred gently to carry out a maceration reaction of the tissues and cells of tomato, followed by a heat treatment to inactivate the added enzyme, obtaining a tomato mass in which the tomato tissues and cells have been perfectly destroyed.

This tomato mass was subjected to a high-speed centrifuge (mfd. by Far East Westfaria Separator KK) for 4-minute continuous centrifugation at 6,000 G and separated into a pasty sediment having high pulp content and a deep red liquid portion containing 15 mg % of lycopene complex.

This liquid portion was passed through a microfiltration membrane [NTF-5202 (0.2 μm pore size, plate type) mfd. by Nitto Denko Co., Ltd.] under the following conditions:

Membrane inlet temperature: 14°–32° C.

Inlet pressure: 2.8 kg/cm$^2$·G

Outlet pressure: 0.2 kg/cm$^2$·G

Circulation flow rate; 80 1/min

From the retentate of the microfiltration membrane, there was collected the tomato pigment containing about 300 mg % of pasty, deed red lycopene and about 1% of insoluble solids. (Analysis of insoluble solid matter was made according to the method described on page 21 of HANDBOOK OF ANALYSES, Tomato Products, Sauce and Venegar (PART 1), March, 1981, compiled by The Japan Inspection Institute of Tomato Products and Seasonings.)

EXAMPLE 2

(Preparation of tomato pigment from tomato paste)

Water was added to a commercially sold tomato paste to prepare an aqueous suspension with a soluble solid content (Brix scale) of 11.0%.

This aqueous suspension was subjected to a high-speed centrifuge (mfd. by Far East Westfaria Separator KK) for 4-minute continuous centrifugation at 6,000 G and thereby separated into a pasty sediment rich in pulp matter and a deep red-tinged first liquid portion containing 17 mg % of lycopene.

Water was added to the pulp-rich pasty sediment to prepare an aqueous suspension having a soluble solid content of 5.0%, and this suspension was again centrifuged continuously for 4 minutes at 6,000 G and separated into a pasty sediment having an even higher pulp content and a second liquid portion tinged in deep red.

The first and second liquid portions were mixed and filtered by a ceramic microfiltration membrane CEFILT (0.2 μm pore size, tubular type, mfd. by NGK Insulators, Ltd.). Microfiltration operating conditions:

Membrane inlet temperature: 21°–32° C.

Inlet pressure: 4.2 kg/cm$^2$·G

Outlet pressure: 3.9 kg/cm$^2$·G

Circulation flow rate: 30 1/min

From the retentate of the microfiltration membrane was collected a tomato pigment containing about 500 mg % of pasty, deep red lycopene and about 1% of insoluble solid matter.

TEST EXAMPLE 1
(Scattered particle size distribution of tomato pigment)

Distilled water was added to the tomato pigment obtained in Example 1 to prepare an aqueous suspension having a lycopene content of 128.5 mg %, and this suspension was analyzed by a HORIBA LA-910 laser analyzer/scattered particle size distribution meter (mfd. HORIBA LTD.) under the following conditions, obtaining the result shown in FIG. 1.

The result confirmed that the tomato pigment obtained in the present invention had an average particle diameter of 1.2 μm.

Analyzing conditions

Transmittance: laser, 88.0%; lamp, 81.2%

State of distribution: standard

Uptake number: 10 times

Refractive index: 1.20–0.001

Dispersion time: 0.0 min

Stirring: 3 range

Circulation: 4 range

Supersonic wave duration: 0.0 min

Waiting period: 0 sec

Display

Particle diameter: based on the number of particles

Particle-particle interval: fixed

Coordinates: log X-linear Y

TEST EXAMPLE 2
(Oxidative and light stability of the tomato pigment)

Said water suspension of tomato pigment having a lycopene content of 128.5 mg % was kept in (a) a dark place at room temperature, (b) a dark thermostatic chamber of 37° C. and (c) a light-illuminated chamber at room temperature for 90 days respectively, and the lycopene content was measured periodically. The results are shown in Table 1.

TABLE 1

Storage stability of the tomato pigment

| Test section | 1 day | 30 days | 60 days | 90 days |
|---|---|---|---|---|
| Dark place at room temp. | 128.5 | 126.3 | 127.1 | 128.9 |
| Dark place controlled at 37° C. | 128.5 | 127.3 | 127.7 | 128.5 |
| Light illuminated at room temp. | 128.5 | 127.1 | 128.6 | 128.7 |

The above results show that there took place no noticeable change of lycopene content in any of the test sections, which attests high oxidative and light stability of the tomato pigment of the present invention.

TEST EXAMPLE 3
(Color stability of the tomato pigment)

A water suspension of the tomato pigment with an initial color tone of L=22.5, a=32.8, b=12.9 and L b/a=8.85 was kept in (a) a dark place of room temperature, (b) a dark thermostatic chamber of 37° C. and (c) a light-illuminated chamber at room temperature for 90 days respectively, and the color tone was measured periodically. A color-difference-meter 1001DP mfd. by Nippon Denshoku Kogyo Co., Ltd. was used for the measurement. The results are shown in Table 2.

TABLE 2

Color stability of the tomato pigment

| | 30 days | | | | 60 days | | | | 90 days | | | |
|---|---|---|---|---|---|---|---|---|---|---|---|---|
| Test section | L | a | b | Lb/a | L | a | b | Lb/a | L | a | b | Lb/a |
| Dark place at room temperature | 22.5 | 32.8 | 12.9 | 8.85 | 22.3 | 32.3 | 12.5 | 8.63 | 22.7 | 31.9 | 12.3 | 8.57 |
| Dark place controlled at 37° C. | 22.5 | 32.7 | 12.5 | 8.60 | 22.6 | 32.9 | 12.8 | 8.79 | 22.9 | 32.2 | 12.6 | 8.96 |
| Light illuminated at room temperature | 22.8 | 32.7 | 12.8 | 8.92 | 22.7 | 32.5 | 12.5 | 8.73 | 22.4 | 32.3 | 22.4 | 8.60 |

From the above results, it is seen that the color tone remained almost the same as the initial level in any of the test sections, which corroborates high color stability of the tomato pigment of the present invention.

TEST EXAMPLE 4
(Heat stability of the tomato pigment)

The water suspension of the tomato pigment having a lycopene content of 128.5 mg % was heat treated at 90°–130° C. for 1–7 minutes, and the lycopene content after each treatment was measured. The results are shown in Table 3.

TABLE 3

Heat stability of the tomato pigment

| Heating temp. (°C.) | Heating time (min) | | |
|---|---|---|---|
| | 1 | 3 | 7 |
| 90 | 128.0 | 127.2 | 125.6 |
| 10 | 127.6 | 121.2 | 122.7 |
| 110 | 129.2 | 130.3 | 127.1 |
| 115 | 121.9 | 122.9 | 128.4 |
| 118 | 119.2 | 113.6 | 125.9 |
| 121 | 128.7 | 114.7 | 125.5 |
| 124 | 128.9 | 121.3 | 127.0 |
| 127 | 129.4 | 118.7 | 121.3 |
| 130 | 122.1 | 125.8 | 124.8 |

The above results show that there is little difference in lycopene content before and after the heat treatment, which indicates very high heat stability of the tomato pigment of the present invention.

TEST EXAMPLE 5
(Storage stability of the heat treated tomato pigment)

The water suspension of the tomato pigment having a lycopene content of 128.5 mg % was heat treated at 95°–130° C. for 5 minutes and then kept in a dark place at room temperature for 90 days, and the lycopene content was measured periodically. The results are shown in Table 4.

TABLE 4

Storage stability in dark place at room temperature of the tomato pigment after heat treatment

| Test section | Days stored | | | |
|---|---|---|---|---|
| | 1 day | 30 days | 60 days | 90 days |
| 95° C./5 min | 128.5 | 126.3 | 125.1 | 128.9 |
| 110° C./5 min | 128.5 | 124.3 | 125.7 | 127.2 |
| 120° C./5 min | 128.5 | 127.1 | 125.6 | 128.7 |
| 130° C./5 min | 128.5 | 125.9 | 127.9 | 127.8 |

The above results show little change of lycopene content in any of the test sections, indicating high storage stability of the tomato pigment of the present invention.

TEST EXAMPLE 6
(Heat sterilization conditions for heat resistant bacteria)

1 ml of the water suspension of the tomato pigment having a lycopene content of 128.5 mg % was supplied into a 3 ml heat-resistant vial, to which was added a pre-culture of the heat-resistant bacteria, *Bacillus pumilas* separated from tomato (the pre-culture obtained by inoculating said heat-resistant bacteria into an ordinary liquid nutrient medium and incubating them at 35° C. for 24 hours) to prepare a tomato pigment contaminated with 102 cfu/ml of heat-resistant bacteria. This water suspension of the tomato pigment was heat treated at 90°–130° C. for 1–7 minutes and the viable count of the bacteria was determined. The results are shown in Table 5.

TABLE 5

Viable count of bacteria after heat treatment of the tomato pigment

| Heating temp. | Heating time | Viable count ($10^2$ cfu/ml) | |
|---|---|---|---|
| 90° C. | 1 min | 383 | 374 |
| | 3 min | 0 | 2 |
| | 7 min | 0 | 0 |
| 100° C. | 1 min | 322 | 229 |
| | 3 min | 0 | 0 |
| | 7 min | 0 | 0 |
| 110° C. | 1 min | 6 | 0 |
| | 3 min | 0 | 0 |
| | 7 min | 0 | 0 |
| 115° C. | 1 min | 5 | 1 |
| | 3 min | 0 | 0 |
| | 7 min | 0 | 0 |
| 118° C. | 1 min | 0 | 0 |
| | 3 min | 0 | 0 |
| | 7 min | 0 | 0 |
| 121° C. | 1 min | 0 | 0 |
| | 3 min | 0 | 0 |
| | 7 min | 0 | 0 |
| 124° C. | 1 min | 0 | 0 |
| | 3 min | 0 | 0 |
| | 7 min | 0 | 0 |
| 127° C. | 1 min | 0 | 0 |
| | 3 min | 0 | 0 |
| | 7 min | 0 | 0 |
| 130° C. | 1 min | 0 | 0 |
| | 3 min | 0 | 0 |
| | 7 min | 0 | 0 |

The above results attest to the fact that a tomato pigment completely free of heat-resistant bacteria can be obtained by subjecting the tomato pigment of the present invention to a heat treatment under the conditions falling in the region above the borderline drawn by connecting the points of 90° C./7 min, 100° C./3 min, 110° C./3 min, 115° C./3 min and 118° C./1 min on a graph of coordinates of heating temperature represented on the vertical axis and heating time (min) on the horizontal.

EXAMPLE 3
(Production of tomato pigment from tomato paste)

Water was added to 230 kg of a tomato paste to adjust the Brix degree to 7.1,150 kg of this solution was triturated by an emulsifier (EBARA MILDER MDN303V-C) at 1,000 r.p.m. and then subjected to a centrifuge (Westfaria Separator SB7-06-076) at 6,000 r.p.m. for 4minutes to remove pulp. The supernatant liquid was recovered. It contained 10 mg % of lycopene. This supernatant liquid was passed through a 0.2 μm cut-off diameter microfilter (SA-0200m fg. by Ceramem; membrane area=11.5 m$^2$) under the conditions of 50° C. and 4kg/cm$^2$. The permeate was separated and the lycopene complex was concentrated in the retentate. The lycopene concentration in this concentrated solution was 0.25%, and its viscosity was 20,000 cp.

Then pectolyase (produced by Seishin Co.) was added to said retentate to a final concentration of 10 mg %, the solution being kept at 30° C. for 30 minutes to decompose the plant tissues, and after reducing the viscosity, the solution was heated to 90° C. to inactivate the added enzyme. This liquid was again passed through a microfilter (NGK-Cefilt; filtration area=0.35 m$^2$) of 0.2 μm of cut-off diameter under the conditions of 50° C. and inlet pressure of 2 kg/cm$^2$, and the tomato pigment containing 0.5% of lycopene was obtained in the membrane-retentate. This tomato pigment was collected, to which food additive ethanol was added and mixed at normal temperature to a final concentration of 75%, and after 30-minute stirring and cleaning with alcohol, the mixture was centrifuged at 5,000 r.p.m. for 15 minutes to separate the sediment from the ethanol portion. Active carbon treated water was added to the collected sediment to obtain 20 kg of a bright red-tinged tomato pigment containing 0.5% of lycopene.

EXAMPLE 4
(Production of tomato pigment from tomato fruit)

1,300 kg of tomato fruit was washed and mashed in the usual ways, and after heated to 65° C., squeezed by a finisher provided with a 0.5 mm screen to obtain 1,150 kg of tomato juice with a Brix degree of 5 and a lycopene content of 12 mg %. This juice was ground twice by an emusifier (EBARA MILDER MDN303V-C) at 1,000 r.p.m.

The resulting solution was subjected to a centrifuge (Far East Westfaria Separator SB7-06-076) at 6,000 r.p.m. for 4 minutes to remove pulp, and the supernatant liquid was recovered. It contained 10 mg % of lycopene. This supernatant liquid was supplied to a microfilter (NITTO DENKO NTF-5202; membrane area=12 m$^2$) of 0.2 μm cut-off diameter. The permeate was separated, and a concentrated solution containing lycopene was obtained as the membrane-retentate. The lycopene concentration in this solution was 0.25%. Then pectinase (a product by Yakult Honsha Co. Ltd.) was added to this concentrated solution to a final concentration of 10 mg % and kept at 30° C. for 30 minutes to disintegrate the plant tissues, and after its viscosity has been reduced, the solution was heated to 90° C. to inactivate the added enzyme. This solution was again filtered by a microfilter (NGK-Cefilt; filtration area=0.35 m$^2$) of 0.2 μm cut-off diameter at 50° C. under inlet pressure of 2.0 kg/cm$^2$ to obtain a tomato pigment containing 0.5% of lycopene in the membrane-retentate. This tomato pigment was collected, to which food additive ethanol was added and mixed at normal temperature to a final concentration of 75%, and after stirring for 30 minutes and cleaning with alcohol, the solution was centrifuged at 5,000 r.p.m. for 5 minutes to separate the sediment from the ethanol phase. Active carbon treated water was added to the collected sediment to obtain 20 kg of a bright red-tinged tomato pigment containing 0.5% of lycopene.

EXAMPLE 5
(Production of tomato pigment from tomato paste)

Water was added to 230 kg of tomato paste to dilute it to a Brix degree of 7.1,150 kg of this solution was ground by an emulsifier (EBARA MILDER MDN303V-C) at 1,000 r.p.m. and then subjected to a centrifuge (WESTFARIA SB7-06-076) at 6,000 r.p.m. for 4 minutes to remove pulp. To eliminate the pulp fragments perfectly, the supernatant liquid was passed through a 300-mesh screen. The lycopene content in this liquid was 10 mg %.

This supernatant liquid was supplied to a microfilter (Ceramem SA-0200; membrane area=11.5 m$^2$) of 0.2 μm cut-off diameter and filtered under the conditions of 50° C. and 4 kg/cm$^2$ to separate the permeate while obtaining a lycopene-containing concentrated solution as the membrfane-retentate. The lycopene concentration in this concentrated solution was 0.25%. This solution was again filtered by a microfilter (NGK-Cefilt; filtration area=0.35 m$^2$) of 0.2 μm cut-off diameter at 50° C. under an inlet pressure of 2.0 kg/cm$^2$ to obtain a tomato pigment containing 1.0% of lycopene in the filter retained liquid. This tomato pigment was recovered, to which food additive ethanol was added and mixed at ambient temperature to a final concentration of 75%, and after 30-minute stirring and alcohol cleaning, the solution was passed through a Buchner funnel provided with No. 101 filter paper to separate the sediment from the ethanol portion. The sediment recovered on the filter paper was collected and active carbon treated water was added thereto to obtain 10 kg of a bright red-tinged tomato pigment containing 1.0% of lycopene.

TEST EXAMPLE 7
(Ethanol concentration and color tone of tomato pigment)

Using the tomato pigment collected from retentate in microfiltration of Example 3, ethanol was added to this tomato pigment to a final conentration of 50–90 w/w % as shown in Table 6 to conduct ethanol cleaning as in Example 1. There was also prepared a tomato pigment specimen which has not been subjected to said ethanol treatment. Each of the specimens was adjusted to a lycopene content of 25 mg %, and the relation between the ethanol final concentration and the color tone of the obtained pigment was examined for the respective specimens and compared. The results are shown in FIG. 6. The color tone was indicated by the value of a/b after measuring a and b by a color-difference-meter (NIPPON DENSHOKU 1001DP). A greater value of a/b signifies a stronger redness.

TABLE 6

| Relation between final concentration of ethanol and the value of a/b | |
|---|---|
| Final concentration of ethanol (W/W %) | a/b |
| No ethanol treatment | 2.59 |
| 50 | 2.73 |
| 60 | 2.79 |
| 65 | 2.81 |
| 70 | 2.82 |
| 75 | 2.91 |
| 80 | 2.92 |
| 85 | 2.92 |
| 90 | 2.92 |

As seen from Table 6, a salient color tone improving effect is observed in the test sections of 50% and higher ethanol concentrations. When the ethanol concentration is less than 50%, sedimentation of the pigment particles was tardy and a great deal of labor an time was required for the recovery of the sedimented pigment. The change of the effect (a/b value) by the increase of ethanol concentration was small in the 60–70% sections, and the effect further increased when the ethanol concentration reached 75% and higher. In view of this change of color tone, it is understood that the final concentration of ethanol is preferably 50–90%, particularly 75% or above.

TEST EXAMPLE 8
(Removal of beta carotene, etc.)

Using the tomato pigment obtained by micro-filtration in Example 3, there was prepared a tomato pigment solution containing 25 mg of lycopene. Ethanol was added to this solution to the final concentrations of 50–90% as shown in Table 7, followed by mixing and stirring for ethanol cleaning. Lycopene (mg), beta carotene (mg) and the unidentified substance (OD 345 nm) eluted in the recovered ethanol phase were measured, and the relation between the final concentration of ethanol and the effect of removing said materials was examined. Lycopene, beta carotene and the unidentified impurity substance measured in terms of OD 354 nm were analyzed by HPLC.

A combination of HITACHI L-6200 pump and WATERS 996 photodiode array detector was used as HPLC analyzer with a Merck Superspher 100RP-18 column (4μm, 4φ×250 mm). Chromatography was carried out at 35° C. with a methanol/acetonitrile/2-propanol (54/44/2) mobile phase at a flow rate of 1.0 ml/min. The lycopene and beta carotene contents were calculated from the peak areas of their standard materials. The elution times of lycopene and beta carotene were 19.7 minutes and 32.6 minutes, respectively. The HPLC elution time of the unidentified substance was 34 minutes, but as it was impossible to determine the absolute amount by its standard material, the value obtained by multiplying absorbance by the total amount of the recovered liquid (ml) was shown.

TABLE 7

Final concentration of ethanol and substances in recovered ethanol

| Final concentration of ethanol (W/W %) | Substances in recovered ethanol | | |
| --- | --- | --- | --- |
| | Lycopene (mg) | Beta carotene (mg) | Unidentified substance ($OD_{354nm}$) |
| 50 | trace | trace | n.d. |
| 60 | trace | trace | n.d |
| 65 | trace | trace | trace |
| 70 | trace | 1.28 | 0.04 |
| 75 | 0.69 | 5.78 | 0.13 |
| 80 | 2.20 | 10.26 | 0.16 |
| 85 | 2.94 | 8.24 | 0.16 |
| 90 | 3.03 | 8.48 | 0.08 |

As is seen from Table 7, when the final concentration of ethanol was increased, beta carotene was eluted in greater quantities, but lycopene was also eluted. Elution of beta carotene was maximized in the 80% ethanol section and slightly lowered in the 85% and upper ethanol sections. On the other hand, lycopene was seen to begin eluting at 75% ethanol, and its elution rate increased in accordance with rise of ethanol concentration in the 80% or upper sections. The subcomponent, i.e. the unidentified substance, showed light absorption characteristics at 354 nm but its elution was high in the 75–85% ethanol sections. These compositional changes endorse the changes of color tone shown in Table 6.

Thus, from the results of Test Examples 7 and 8, it is seen that when cleaning and purification of the tomato pigment with ethanol is carried out by adjusting the final concentration of ethanol to 50–90%, preferably 75–85%, the impurity substances in the recovered ethanol are eluted to remarkably improve the color tone of the tomato pigment.

The tomato pigment obtained from the ethanol treatment can be used in the form as it is, but if necessary ethanol can be removed from the tomato pigment by adding several times as much amount of water to the tomato pigment containing ethanol, treating the solution by a microfilter of the same type as used for lycopene concentration, which is capable of separating the particles of the sizes of around 0.1–10 μm, and discharging the ethanol/water mixture.

EXAMPLE 6

(Use of the tomato pigment of this invention in beverages)

An ethanol-cleaned tomato pigment of the present invention obtained in Example 3 and, for comparison, a tomato pigment not cleaned with ethanol were added respectively to a sport drink of the following composition so that the drink would contain 5 mg % of lycopene, thereby preparing 1 kg each of the colored sport drinks. The color tone of each drink was comparatively evaluated with the naked eye by 6 experienced panelists.

<Sport drink composition>

| | |
| --- | --- |
| Liquid fructose/dextrose | 65 g |
| Oligosaccharide | 30 g |
| Citric acid | 2 g |
| Sodium chloride | 1 g |
| Vitamin C | 2 g |
| Calcium lactate | 0.2 g |
| Spicery Essence | 1 ml |

As a result, the drink using the tomato pigment of the present invention obviously assumed a bright red color tone and could be readily identified. This bespeaks useful applicability of the tomato pigment of the present invention as a coloring matter for drinks.

EXAMPLE 7

(Use of the tomato pigment of this invention in jelly foods)

An ethanol-cleaned tomato pigment of the present invention obtained in Example 3 and, for comparison, a tomato pigment not cleaned with ethanol were added to a jelly food of the following composition so that the food would contain 5 mg % of lycopene, thereby preparing 1 kg each of the colored jelly foods. The color tone of each jelly food was comparatively evaluated with the naked eye by 6 experienced panelists.

<Jelly food composition>

| | |
| --- | --- |
| Liquid fructose/dextrose | 60 g |
| Gelling agent | 2 g |
| Citric acid | 2 g |
| Vegetable extract | 10 g |
| Sodium chloride | 3 g |
| Spicery Essence | 1 ml |

As a result, the jelly food using the tomato pigment of the present invention obviously assumed a bright red color tone and could be readily identified, indicating usefulness of the tomato pigment of the present invention as a coloring matter for jelly foods.

EFFECT OF THE INVENTION

The tomato pigment produced according to the method of the present invention maintains the shape of lycopene particles, that is, the shape of chloroplast, as the chloroplast membrane structure is not destroyed. Also, since lycopene is present in the natural membrane structures, it maintains a bright red color tone.

According to the present invention, therefore, it is possible to produce efficiently and by simple means the tomato pigment having lycopene as main component, high in purity and presenting a bright red color tone. The tomato pigment obtained according to the method of the present invention is of great industrial utility as it can be widely utilized as a natural coloring matter for foods, a natural pigment for cosmetics such as rouge, etc.

What is claimed is:

1. A method for collecting a tomato pigment containing lycopene comprising 1) crushing, grinding, mashing, or straining a mass of tomato, or treating the mass of tomato with a plant tissue maceration enzyme; 2) centrifuging the mass to recover a liquid portion; 3) passing the liquid portion through a microfilter; and 4) collecting the retentate.

2. The method according to claim 1 wherein the tomato pigment contains at least 300 mg % lycopene.

3. The method of claim 1 further comprising adding an organic solvent to the retentate to form a mixture having an organic solvent concentration of 50–90 w/w %, stirring the mixture, and recovering the sediment.

4. The method of claim 1 wherein the microfilter has a membrane having an average pore size of 0.1–0.5 µm.

5. The method of claim 3 wherein the organic solvent is ethanol and the ethanol concentration is 75–85 w/w %.

* * * * *